(No Model.)  2 Sheets—Sheet 1.
J. CHAPUIS.
SEED AND FERTILIZER DISTRIBUTER.
No. 307,015. Patented Oct. 21, 1884.
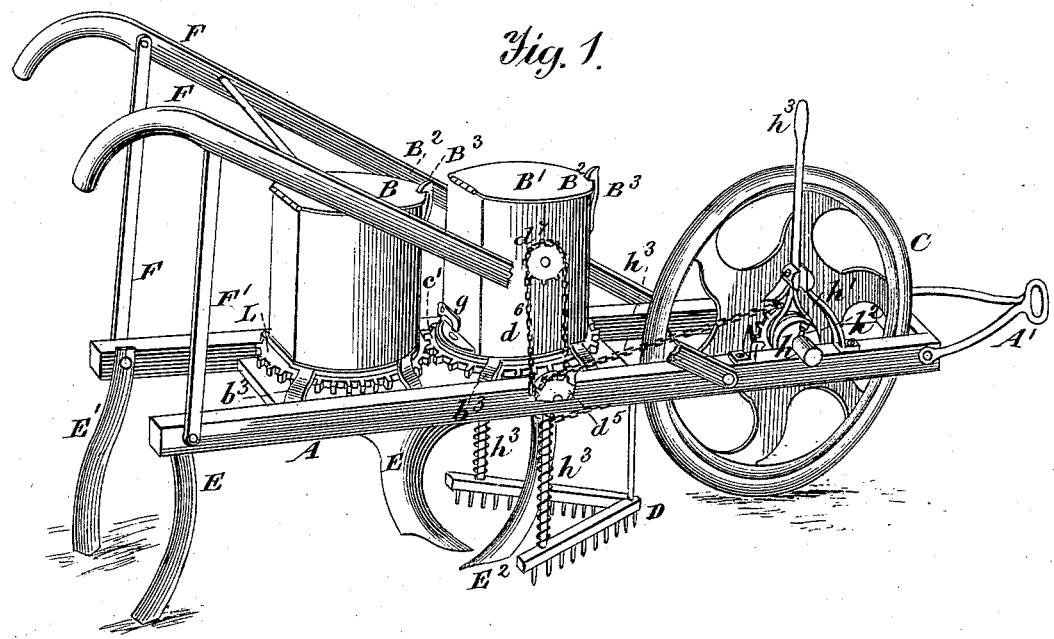
Fig. 1.
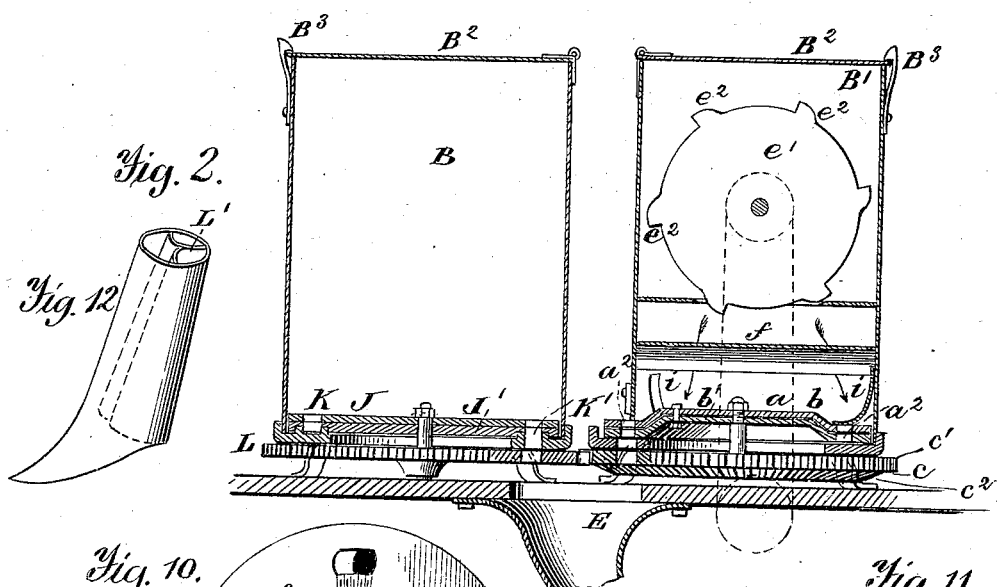
Fig. 2.
Fig. 12.
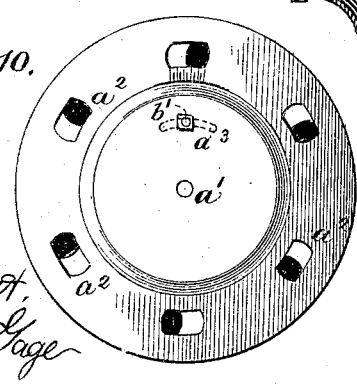
Fig. 10.
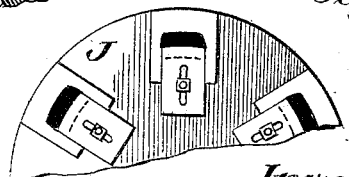
Fig. 11.
Witnesses.
A. Rippett
Alfred T. Gage
Inventor:
John Chapuis
by England & Blanchard
Attys (No Model.) 2 Sheets—Sheet 2.
J. CHAPUIS.
SEED AND FERTILIZER DISTRIBUTER.
No. 307,015. Patented Oct. 21, 1884.
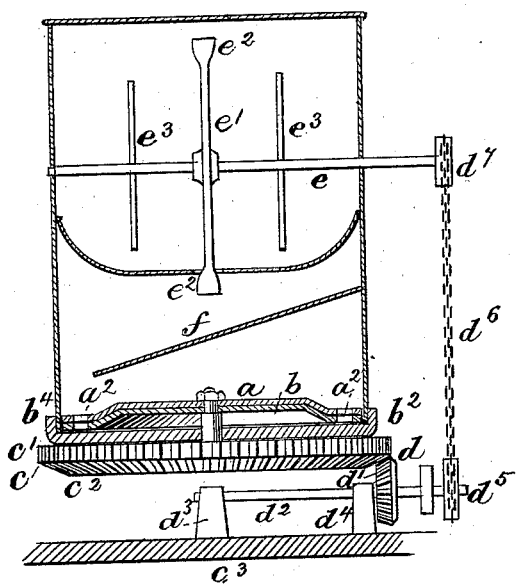
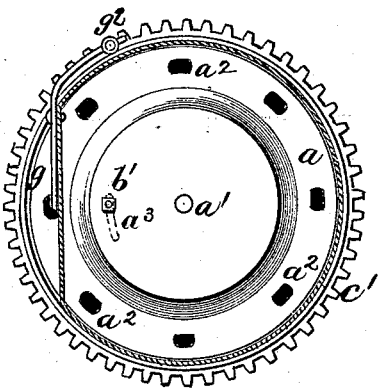
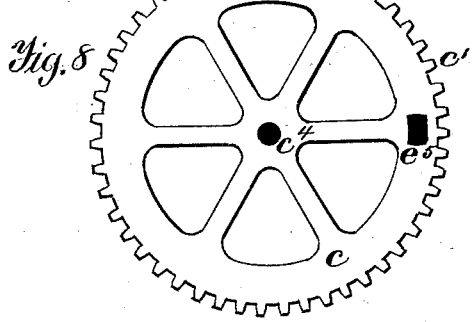
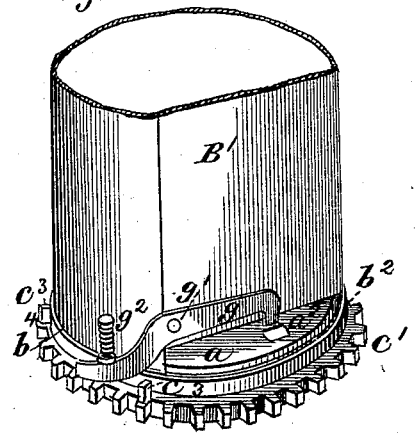
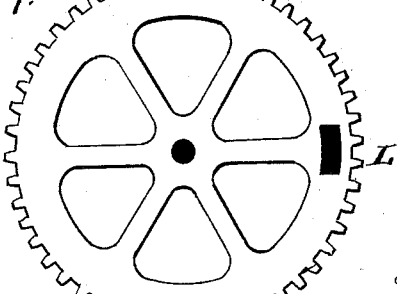
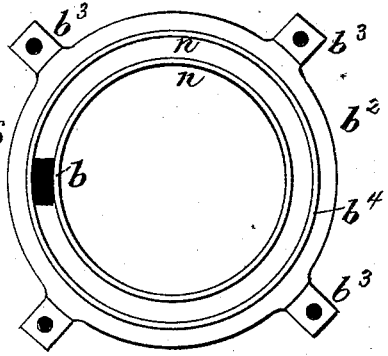
Witnesses.
A. Ruppert,
Alfred T. Gage
Inventor:
John Chapuis
by England & Blanchard
Attys

UNITED STATES PATENT OFFICE.

JOHN CHAPUIS, OF ATLANTA, GEORGIA.

SEED AND FERTILIZER DISTRIBUTER.

SPECIFICATION forming part of Letters Patent No. 307,015, dated October 21, 1884.

Application filed March 10, 1884. (No model.)

*To all whom it may concern:*

Be it known that I, JOHN CHAPUIS, a citizen of the United States, residing at Atlanta, in the county of Fulton and State of Georgia, have invented certain new and useful Improvements in Seed and Fertilizer Distributers, of which the following is a specification, reference being had therein to the accompanying drawings.

My invention relates to certain new and useful improvements in seed-drills and fertilizer-distributers; and it consists in arranging on a suitable frame receptacles for seed and fertilizers and operating mechanism for discharging the same in suitable quantities, said mechanism being operated by a drive-wheel located in the front part of the frame; and it further consists in the peculiar arrangement of a harrow, furrow-openers, discharge-spout, and seed-coverers.

The objects of my invention are, first, to evenly distribute the seed in any desired quantity; second, to distribute the seed and fertilizer simultaneously in such a manner that the seed will be inclosed in fertilizer when left in the earth and covered; third, to prepare the seed-bed, open the furrow, and close the same at the time the seeds and fertilizer are deposited.

I attain these objects by means of the peculiar arrangement and construction of the various parts of my device, which will be more fully pointed out and described in the specification and claim, reference being had to the drawings accompanying this application and forming part of the same, in which—

Figure 1 is a perspective view of my invention, showing the frame, drive-wheel, seed and fertilizer chambers, furrow-openers, &c. Fig. 2 is a vertical sectional view of the seed and fertilizer chambers, and discharge-tube, and revolving wheels. Fig. 3 is a view, partly in section and partly in elevation, showing gear-wheels and chain connections. Fig. 4 is a plan view, partly in section, of the seed-wheels and lever. Fig. 5 is a perspective view of the seed-chamber, showing gear-wheel and lever. Fig. 6 is a plan view of the bottom of seed and fertilizer chambers. Fig. 7 is a sectional view of the lower parts of the fertilizer-drum. Fig. 8 is a view of the gear-wheel below seed-chamber. Fig. 9 is a view of the gear-wheel under the fertilizer-drum. Fig. 10 is a view of the upper seed-discharge wheel, and Fig. 11 is a modification of the seed-wheel, showing adjustable slides. Fig. 12 is a view of furrow-opener and delivery-tube.

Similar letters refer to similar parts throughout the drawings.

Referring to the drawings, A represents a frame formed of any suitable material, to the front end of which is attached a forked draft-bar, A'. A drive-wheel, C, is journaled between the sides of the frame near the front end.

To the top of frame A, about midway its length, are secured two drums or chambers, B and B', and underneath the frame are secured a curved seed-tube, E, seed-coverers E', furrow-opener E$^2$, and harrow D. A suitable pair of handles, F, are also attached to the frame and secured at the right angle by braces F. Seed-chamber B' and fertilizer-chamber B are provided with hinged covers B$^2$, that are held in place by catches B$^3$. Seed-chamber B' is secured to a circular base-plate having perforated projections or legs, by which it is secured to the frame A. A circular seed-plate, $a$, formed with a central perforation, $a'$, elongated perforations $a^2$ near its outer edge, and a curved guide-slot, $a^3$, between the outer and central perforations. Said plate is placed near the bottom of seed-chamber B' on the inside.

Directly under plate $a$ is placed a similar plate having similar perforations, said plates being held together and adjusted as to the perforations by screw-bolt $b'$.

Underneath the chamber B' is arranged a gear-wheel, $c$, having straight gear $c'$ on its outer edge and beveled gear $c^2$ on its under edge. A central bolt extends from the upper face of said wheel, passing through the bottom of chamber B' and the seed-wheels $a$, and is secured by a nut, as shown in Figs. 2 and 3. The purpose of this construction is to revolve the seed-wheels $a$. The wheel $c$ gears with wheel $d$, having gear-teeth $d'$, said wheel being rigidly attached to shaft $d^2$, that is journaled in brackets $d^3$ and $d^4$, the outer end of said shaft being provided with a rigid sprocket-wheel, $d^5$, around which passes chain $d^6$, that also passes around sprocket-wheel $d^7$, said wheel being rigidly secured to shaft $e$, which is journaled in the upper part of chamber B'.

A feed-wheel, $e'$, is rigidly secured to shaft $e$, the outer edge of said wheel having lip projections $e^2$, formed for the purpose of delivering the seed below onto an inclined apron, $f$, one end of said apron being secured to the inside curved part of chamber B', and the opposite or free end extending downward at an incline, and terminating a short distance from the flat front of chamber B', as shown in Fig. 3, the purpose of which is to deflect the seed to the outer edge of wheel $a$, so that the openings $a^2$ may be filled, as they pass, with seed. On each side of the feeding-wheel $e'$ pins $e^3$ extend from the shaft $e$, the purpose of which is to stir up the seed, so that the wheel $e'$ will deliver the same without clogging.

As shown in Figs. 1 and 5, the chamber B' is formed flat a portion of its outer surface, and cut away at the lower edge of said flat surface, to permit wheel $a$ to present one of the openings $a^2$ filled with seed outside the chamber B', said opening being presented directly under the inner end of discharger $g$, said discharger being formed with an angular projection at one end, and the opposite end curved downward and outward. Said discharger is pivoted at one edge of the flat surface by a pivot-pin, $g'$, and its outer curved end rests against a coiled spring, $g^2$, said spring being secured to the side of chamber B'. A projection, $c^3$, or one or more of the same, are secured to the upper face of gear-wheel $c$, and as said wheel revolves, the projection $c^3$, passing under the outer end of discharger $g$, lifts the same against the tension of spring $g^2$ and forces the inner end into one of the openings $a^2$, forcing the seed down through said opening through wheel $c$ into the discharge-tube E, where it is delivered, with the fertilizer, into the earth. The amount of seed sowed is regulated by adjusting the wheel $a$ with the wheel beneath it by means of the screw-bolt $b'$, and the distance apart that the seed may be deposited is regulated by the speed of the wheel $c$, which is changed to run slow or fast by shifting the chain $h^4$ onto a small or large pulley on shaft $d^2$. Drive-wheel C is provided with a sprocket-wheel, $h$, on its shaft, that receives motion from said shaft by means of clutch $h'$, which is beveled on its outer end face, leaving a shoulder which abuts against a stop-pin, $h^2$; but when reversed the pin moves freely against said face in said shaft, said clutch being operated by lever $h^3$, as shown in Fig. 1. Sprocket-wheel $h$ is connected with wheel $d^2$ by means of chain $h^4$. Curved flexible springs or compressors $i$ are secured at one end to the inside of chamber B', the free ends being adjusted to force the seed into the openings $a^2$ as wheel $a$ revolves. Fertilizer-drum B is formed similar to chamber B', except that the wheels J and J' are made flat on their upper surface, and have openings K K', that when revolved register with an opening in the bottom of drum B, which is over the mouth of the delivery-tube E. Gear-wheel L is provided with openings to register with openings K', and the wheel also gears with wheel $c$, from which it receives motion. Delivery-tube E or furrow-opener is formed with partitions $l'$, to deliver the fertilizer on each side of the seed as it passes into the earth.

The operation is as follows: Power is attached to draft-bar A'. Fertilizer is placed in drum B and seed in chamber B'. Clutch $h'$ is thrown against the pin $h^2$, when motion is communicated to shaft $d^2$, which in turn, by means of chain and gear wheels, operates the mechanism of the chamber B' and drum B. The seed is forced into the tube E by the discharger $g$. The fertilizer falling through the openings into tube E at the same time covers the seed, and places in the seed-bed a small quantity before and after the seed is dropped, on each side of it.

Having thus described my invention, what I claim, and desire to secure by Letters Patent, is—

In a seed-distributer, the chamber B', having the incline $f$, and perforated bottom $b^2$, in combination with the wheels $a\ b$, having openings $a^2$, and means for adjusting them, the perforated gear-wheel $c$, shaft $d^2$, having suitable bearings, gear-pinion $d'$, pulley $d^5$, shaft $e$, journaled in the upper part of chamber B', stirrers on said shaft, pulley $d^7$, belt $d^6$, and discharger $g$, having spring $g^2$, substantially as described.

In testimony whereof I affix my signature in presence of two witnesses.

JOHN CHAPUIS.

Witnesses:
 LABAN F. SMITH,
 E. M. ROBERTS.